United States Patent
De La Breteche et al.

(10) Patent No.: US 11,120,481 B2
(45) Date of Patent: Sep. 14, 2021

(54) PREDICTIVE ADJUSTED BIDDING FOR ELECTRONIC ADVERTISEMENTS

(71) Applicant: CRITEO SA, Paris (FR)

(72) Inventors: Alban De La Breteche, Paris (FR); Alexis Audran-Reiss, La Celle Saint Cloud (FR); Arnaud Blanchard, Paris (FR); Arnaud Chataignier, Courbevoie (FR); Charles-Henri Henault, Paris (FR); Eustache Diemert, Claix (FR); Mathieu Henniart, Paris (FR); Mathieu Lindemann, Saint-Germain-en-Laye (FR); Patrick De Pas, Paris (FR); Pierre Nicolas, Paris (FR); Thomas Ricatte, Paris (FR)

(73) Assignee: CRITEO SA, Paris (FR)

( * ) Notice: Subject to any disclaimer, the term of this patent is extended or adjusted under 35 U.S.C. 154(b) by 365 days.

(21) Appl. No.: 15/796,688

(22) Filed: Oct. 27, 2017

(65) Prior Publication Data
US 2019/0130456 A1 May 2, 2019

(51) Int. Cl.
G06Q 30/02 (2012.01)
G06N 7/00 (2006.01)

(52) U.S. Cl.
CPC ......... *G06Q 30/0275* (2013.01); *G06N 7/005* (2013.01)

(58) Field of Classification Search
USPC ............................................. 705/14.43, 14.1
See application file for complete search history.

(56) References Cited

U.S. PATENT DOCUMENTS

| | | |
|---|---|---|
| 8,990,105 B1 | 3/2015 | Shatkin-Margolis et al. |
| 10,169,778 B1 | 1/2019 | Collin et al. |
| 10,282,758 B1 * | 5/2019 | Els ..................... G06Q 30/0275 |
| 2002/0120504 A1 | 8/2002 | Gould et al. |
| 2003/0187923 A1 | 10/2003 | Kimura et al. |
| 2003/0220866 A1 | 11/2003 | Pisaris-Henderson et al. |
| 2005/0033641 A1 | 2/2005 | Jha et al. |
| 2006/0041638 A1 | 2/2006 | Whittaker et al. |
| 2006/0085275 A1 | 4/2006 | Stokes et al. |
| 2006/0218035 A1 | 9/2006 | Park et al. |
| 2006/0253319 A1 | 11/2006 | Chayes et al. |
| 2007/0150353 A1 | 6/2007 | Krassner et al. |

(Continued)

*Primary Examiner* — Afaf Osman Bilal Ahmed
(74) *Attorney, Agent, or Firm* — Proskauer Rose LLP (57) ABSTRACT

Methods and systems are described herein for predictive adjusted bidding for electronic advertisements. A bid determination computing device receives, from an ad exchange computing device, a bid request for an available underlying impression opportunity. The bid determination device determines an opportunity value estimate for the impression opportunity based upon the bid request, and determines a probability of a submission of one or more other bid requests for the same impression opportunity by the same ad exchange device or by one or more other ad exchange devices. When the determined probability indicates a submission of one or more other bid requests for the same impression opportunity, the bid determination device adjusts the opportunity value estimate for the impression opportunity based upon the determined probability and transmits the opportunity value estimate to the ad exchange device in response to the bid request.

18 Claims, 8 Drawing Sheets

(56) References Cited

U.S. PATENT DOCUMENTS

| | | |
|---|---|---|
| 2007/0168506 A1 | 7/2007 | Douglas et al. |
| 2007/0204014 A1 | 8/2007 | Greer et al. |
| 2008/0004962 A1 | 1/2008 | Muthukrishnan et al. |
| 2008/0243592 A1 | 10/2008 | Song et al. |
| 2009/0024737 A1 | 1/2009 | Goldspink et al. |
| 2009/0063491 A1 | 3/2009 | Barclay et al. |
| 2009/0089151 A1 | 4/2009 | Protheroe et al. |
| 2009/0125719 A1 | 5/2009 | Cochran et al. |
| 2009/0172091 A1 | 7/2009 | Hamel |
| 2009/0254414 A1 | 10/2009 | Schwarz et al. |
| 2010/0057566 A1 | 3/2010 | Itzhak |
| 2010/0094704 A1 | 4/2010 | Subramanian et al. |
| 2010/0125506 A1 | 5/2010 | Vassilvitskii et al. |
| 2010/0198772 A1 | 8/2010 | Silverman et al. |
| 2010/0217797 A1 | 8/2010 | Kirsch et al. |
| 2011/0035259 A1 | 2/2011 | Das et al. |
| 2011/0087543 A1 | 4/2011 | Coon |
| 2011/0125577 A1 | 5/2011 | Song et al. |
| 2011/0125595 A1 | 5/2011 | Neal et al. |
| 2011/0131099 A1 | 6/2011 | Shields et al. |
| 2011/0185016 A1 | 7/2011 | Kandasamy et al. |
| 2011/0225637 A1 | 9/2011 | Counterman |
| 2012/0054019 A1 | 3/2012 | Kitts et al. |
| 2012/0143713 A1 | 6/2012 | Dittus et al. |
| 2012/0173981 A1 | 7/2012 | Day |
| 2012/0271883 A1 | 10/2012 | Montoya et al. |
| 2012/0310729 A1* | 12/2012 | Dalto ............... G06Q 30/02 705/14.43 |
| 2014/0058812 A1 | 2/2014 | Bender et al. |
| 2015/0019331 A1 | 1/2015 | Chambard et al. |
| 2015/0302470 A1 | 10/2015 | Dru et al. |
| 2015/0317670 A1 | 11/2015 | Cavander et al. |
| 2016/0275554 A1 | 9/2016 | Yan et al. |
| 2016/0307236 A1 | 10/2016 | Lidow |
| 2019/0164175 A1 | 5/2019 | Dilling et al. |

\* cited by examiner

Condition: Identical user_id (y=yes, n=no)

| bid_request_id | 1 | 2 | 3 | 4 | 5 | 6 | 7 | 8 |
|---|---|---|---|---|---|---|---|---|
| 1 | y | y | y | y | y | n | n | n |
| 2 | y | y | y | y | y | n | n | n |
| 3 | y | y | y | y | y | n | n | n |
| 4 | y | y | y | y | y | n | n | n |
| 5 | y | y | y | y | y | n | n | n |
| 6 | n | n | n | n | n | y | y | y |
| 7 | n | n | n | n | n | y | y | y |
| 8 | n | n | n | n | n | y | y | y |

Condition: Identical timestamp (y=yes, n=no)

| bid_request_id | 1 | 2 | 3 | 4 | 5 | 6 | 7 | 8 |
|---|---|---|---|---|---|---|---|---|
| 1 | y | y | y | n | n | n | n | n |
| 2 | y | y | y | n | n | n | n | n |
| 3 | y | y | y | n | n | n | n | n |
| 4 | n | n | n | y | y | n | n | n |
| 5 | n | n | n | y | y | n | n | n |
| 6 | n | n | n | n | n | y | y | n |
| 7 | n | n | n | n | n | y | y | n |
| 8 | n | n | n | n | n | n | n | y |

Condition: Identical publisher (y=yes, n=no)

| bid_request_id | 1 | 2 | 3 | 4 | 5 | 6 | 7 | 8 |
|---|---|---|---|---|---|---|---|---|
| 1 | y | y | y | y | y | y | n | n |
| 2 | y | y | y | y | y | y | n | n |
| 3 | y | y | y | y | y | y | n | n |
| 4 | y | y | y | y | y | y | n | n |
| 5 | y | y | y | y | y | y | n | n |
| 6 | y | y | y | y | y | y | n | n |
| 7 | n | n | n | n | n | n | y | y |
| 8 | n | n | n | n | n | n | y | y |

Condition: Identical format (y=yes, n=no)

| bid_request_id | 1 | 2 | 3 | 4 | 5 | 6 | 7 | 8 |
|---|---|---|---|---|---|---|---|---|
| 1 | y | y | y | n | n | y | y | n |
| 2 | y | y | y | n | n | y | y | n |
| 3 | y | y | y | n | n | y | y | n |
| 4 | n | n | n | y | y | n | n | y |
| 5 | n | n | n | y | y | n | n | y |
| 6 | y | y | y | n | n | y | y | n |
| 7 | y | y | y | n | n | y | y | n |
| 8 | n | n | n | y | y | n | n | y |

| bid_request_id | 1 | 2 | 3 | 4 | 5 | 6 | 7 | 8 |
|---|---|---|---|---|---|---|---|---|
| 1 | | 1 | 1 | | | | | |
| 2 | 1 | 1 | | | | | | |
| 3 | 1 | 1 | 1 | | | | | |
| 4 | | | | | 1 | | | |
| 5 | | | | 1 | 1 | | | |
| 6 | | | | | | 1 | | |
| 7 | | | | | | | 1 | |
| 8 | | | | | | | | 1 |

PREDICTIVE ADJUSTED BIDDING FOR ELECTRONIC ADVERTISEMENTS

TECHNICAL FIELD

The present technology relates to electronic advertisements and, more particularly, to techniques for predictive adjusted bidding for electronic advertisements.

BACKGROUND

Publisher systems can provide webpages or other online content that can include one or more advertisement display opportunities for computerized graphical advertisement displays (e.g., space for a banner advertisement across the top of the webpage, within an application, or within other media such as videos or images). In some instances, when a user device (e.g., a computer running a web browser) processes a webpage for display, the user device can request, from an ad system, graphical display source code for a computerized graphical advertisement display for one of the advertisement display opportunities. The ad system can provide the graphical display source code to the user device to render and/or display.

As part of the advertisement selection process, the ad system communicates with real-time bidding (RTB) computing platforms. The RTB platforms receive bids from various third-party bidding agent systems (also called demand-side platforms (DSP)) that submit bids for the advertisement display opportunity on behalf of advertisers. Typically, the bidding agent systems are responsible for generating a bid for advertisement opportunities that meet the advertiser's requirements, such as cost, value, and audience considerations. The RTB platforms coalesce the bids received from the various DSPs and determine whether the advertisement display opportunity is selected after analyzing the received bids.

In some instances, multiple bids for the same advertisement display opportunity can be received by the ad system from multiple RTB platforms and/or from the same RTB platform in quick succession. The multiple bids can be configured with varying pricing strategies that have different characteristics. For example, a publisher may put forth an advertisement display opportunity simultaneously on different ad exchanges and/or with different floor prices. For an advertising business participating in all the proposed auctions by submitting bids can be inefficient as the publisher would rationally honor the auction for which the bids result in the highest payment. A particular case that illustrates this inefficiency for the advertiser is the one where the publisher proposes two simultaneous auctions with different reserve prices and the advertiser value is above the highest reserve price of the two. In that case the publisher should accept the auction with the highest reserve price and the advertiser's loss is the difference between the two reserve prices compared to the optimal case where he would only participate in the auction with the lowest reserve price.

SUMMARY

Accordingly, there is a need for technology to dynamically and programmatically adjust opportunity value estimates (such as bids) in the computerized advertisement bidding process according to a predicted probability that multiple different bids are received for the same underlying advertisement impression opportunity at or near the same time—including the capability to automatically adjust the bid in order to lower costs associated with the bid and impression opportunity. As an example, when the improved computing system described herein identifies a bid as part of different bids for the same opportunity, then, depending on the strategy implemented, the computing process can be stopped before its end. Reducing the time spent to process the requests allows the computing system to reduce the quantity of computer power and processing cycles needed to process the bids and therefore result in reduced infrastructure requirements (e.g., servers, hosting, and the like).

In one aspect, there is a computerized method of predictive adjusted bidding for electronic advertisements. A bid determination computing device receives, from an ad exchange computing device, a bid request for an available underlying impression opportunity during rendering of a webpage. The bid determination computing device determines an opportunity value estimate for the available underlying impression opportunity based upon the bid request. The bid determination computing device determines a probability of a submission of one or more other bid requests for the same available underlying impression opportunity during rendering of the webpage by the same ad exchange computing device or by one or more other ad exchange computing devices. When the determined probability indicates a submission of one or more other bid requests for the same available underlying impression opportunity, the bid determination computing device adjusts the opportunity value estimate for the available underlying impression opportunity based upon the determined probability, and transmits the opportunity value estimate to the ad exchange computing device in response to the bid request.

In another aspect, there is a system for predictive adjusted bidding for electronic advertisements. The system includes a bid determination computing device. The bid determination computing device receives, from an ad exchange computing device, a bid request for an available underlying impression opportunity during rendering of a webpage. The bid determination computing device determines an opportunity value estimate for the available underlying impression opportunity based upon the bid request. The bid determination computing device determines a probability of a submission of one or more other bid requests for the same available underlying impression opportunity during rendering of the webpage by the same ad exchange computing device or by one or more other ad exchange computing devices. When the determined probability indicates a submission of one or more other bid requests for the same available underlying impression opportunity, the bid determination computing device adjusts the opportunity value estimate for the available underlying impression opportunity based upon the determined probability, and transmits the opportunity value estimate to the ad exchange computing device in response to the bid request.

Any of the above aspects can include one or more of the following features. In some embodiments, the probability of a submission is determined based upon at least one characteristic of the available impression opportunity. In some embodiments, the at least one characteristic of the available impression opportunity is a characteristic received from the ad exchange computing device that submitted a corresponding bid request. In some embodiments, the at least one characteristic is associated with a publisher of the available underlying impression opportunity. In some embodiments, the at least one characteristic of the available underlying impression opportunity is a URI associated with the available underlying impression opportunity. In some embodiments, the at least one characteristic of the available underlying impression opportunity is a time of day associated with the bid request. In some embodiments, the at least one characteristic of the available underlying impression opportunity is a user identifier associated with the available underlying impression opportunity. In some embodiments, the at least one characteristic of the available underlying impression opportunity is a format of the impression associated with the available underlying impression opportunity.

In some embodiments, the bid determination computing device determines an expected profitability of the available underlying impression opportunity, when a bid placed in response to any bid request would win the available underlying impression opportunity, using one or more of: a characteristic of the bid request or a predicted profitability based upon information from prior similar bid requests. In some embodiments, the bid determination computing device identifies that the bid request and the one or more other bid requests are for the same available underlying impression opportunity, groups the bid request and the one or more other bid requests, and compares one or more characteristics of each of the bid request and the one or more other bid requests. In some embodiments, the one or more characteristics of each of the bid request and the one or more other bid requests comprise a pricing characteristic and a reliability characteristic. In some embodiments, the bid determination computing device adjusts the opportunity value estimate for the available underlying impression opportunity based upon one or more of: the expected profitability, the predicted profitability, or one or more characteristics of the bid request. In some embodiments, identifying that the bid request and the one or more other bid requests are for the same available underlying impression opportunity comprises determining a time of arrival for each of the bid request and the one or more other bid requests. In some embodiments, the bid determination computing device identifies that the bid request and the one or more other bid requests are for the same available underlying impression opportunity based upon a similarity between the time of arrival for the bid request and the time of arrival for each of the one or more other bid requests. In some embodiments, the bid determination computing device identifies that the bid request and the one or more other bid requests are for the same available underlying impression opportunity based upon a denoising process that uses historical bid requests stored in a database.

In some embodiments, the bid determination computing device identifies that the bid request and the one or more other bid requests are for the same available underlying impression opportunity based upon a similarity between a publisher associated with the bid request and a publisher associated with each of the one or more other bid requests. In some embodiments, the bid determination computing device identifies that the bid request and the one or more other bid requests are for the same available underlying impression opportunity based upon a similarity between a format of the impression associated with the bid request and a format of the impression associated with each of the one or more other bid requests. In some embodiments, the bid determination computing device identifies that the bid request and the one or more other bid requests are for the same available underlying impression opportunity based upon a similarity between an ad exchange that submitted the bid request and an ad exchange that submitted each of the one or more other bid requests. In some embodiments, the step of adjusting the opportunity value estimate for the available underlying impression opportunity comprises adjusting the opportunity value estimate by an amount dependent on one or more of: the determined probability or an estimated profitability associated with one or more of the other bid requests. In some embodiments, the opportunity value estimate is decreased to zero. In some embodiments, the bid determination computing device, whether to submit a bid in response to the bid request based upon the estimated profitability associated with one or more of the other bid requests and one or more predicted characteristics of the other bid requests.

In some embodiments, the ad exchange computing device is a real-time bidding platform, an ad server, a computing device executing an auction for the available impression opportunity within a browser, or a computing device executing an auction for the available underlying impression opportunity within a mobile application. In some embodiments, each of the one or more other bid requests is associated with a different one of the one or more other ad exchange computing devices. In some embodiments, the bid request for the available underlying impression opportunity is received during playback of a video. In some embodiments, the bid request is received from a remote computing system via an interface to the bid determination computing device. In some embodiments, the interface is a web service API.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

The present technology provides systems and methods for predictive adjusted bidding for electronic advertisements, particularly computerized graphical display advertisements. Although the technology is illustrated and described herein with reference to specific embodiments, the technology is not intended to be limited to the details shown. Various modifications can be made in the details within the scope the claims and without departing from the technology.

Figure 1:
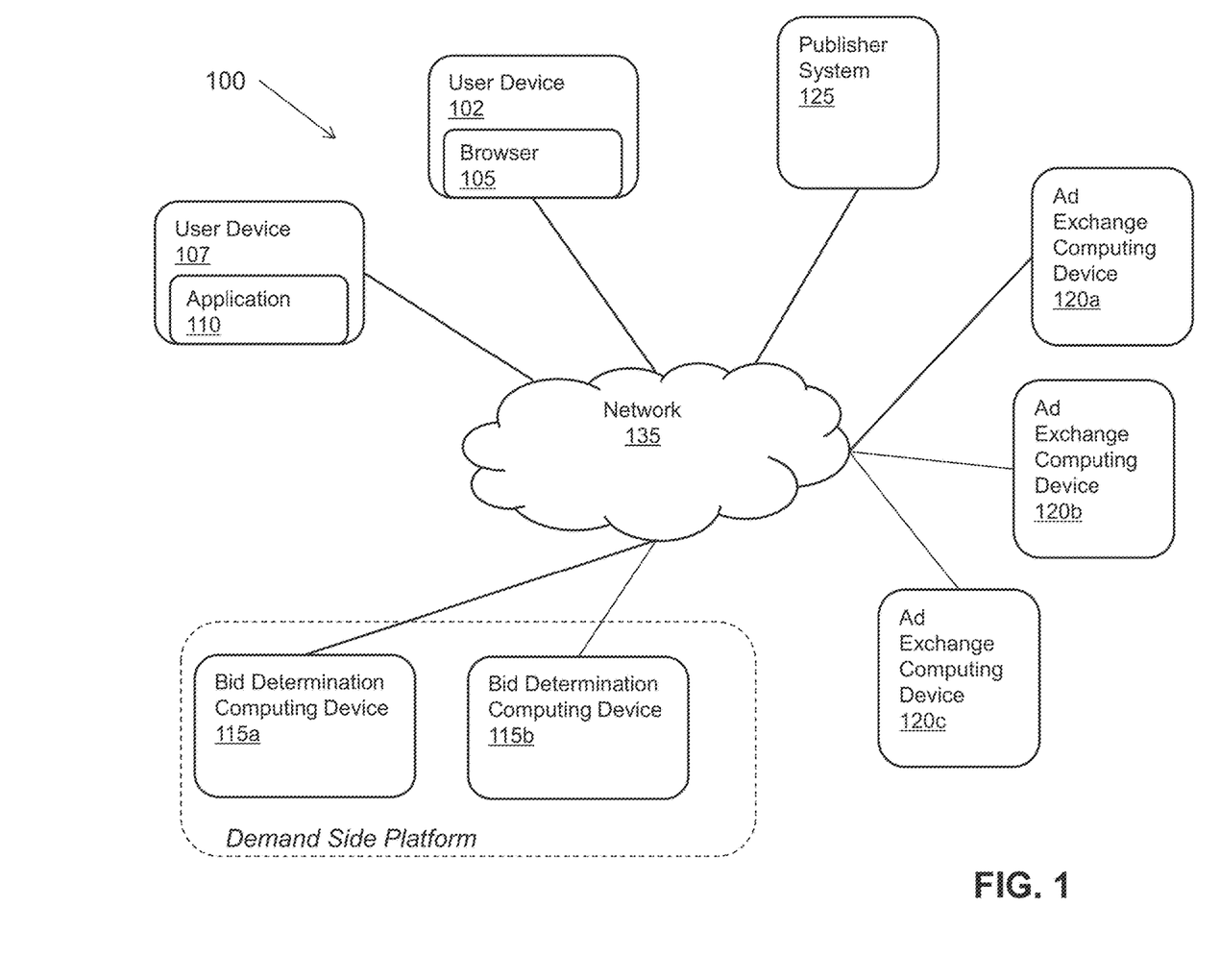
FIG. 1 is a diagram of a networked system in accordance with embodiments of the technology.

FIG. 1 is a diagram of networked system 100 in accordance with embodiments of the technology. As illustrated, networked system 100 can include user device 102, user device 107, bid determination computing devices 115a, 115b (which collectively can comprise a demand side platform (DSP)), ad exchange computing devices 120a, 120b, 120c, and publisher system 125. User device 102, user device 107, bid determination computing devices 115a, 115b, ad exchange computing devices 120a, 120b, 120c, and publisher system 125 can be in data communication via network 135. User devices 102 and 107 can each be any computing devices. In some embodiments, user devices 102 and 107 can each be one of a mobile computing device (e.g., cellular phones and/or tablets), a PC, or other computing device. User device 102 executes web browser 105. User device 107 executes application 110 (e.g., a mobile application that interacts with online content).

Bid determination computing devices 115a, 115b can be any computing device, such as a server or multiple servers. In some embodiments, bid determination computing devices 115a, 115b can receive bid requests from one or more of ad exchange computing devices 120a, 120b, 120c and generate opportunity value estimates, such as bids, on behalf of advertisers, which the bid determination computing devices 115a, 115b then submit to the respective ad exchange computing devices 120a, 120b, 120c in response to the bid requests. In some embodiments, the bid determination computing devices and ad exchange computing devices communicate using a specialized application programming interface (API), using specifically-formatted data requests and responses. Network 135 can be any network or multiple networks. For example, network 135 can include cellular networks through which user devices 102 and 107 are connected and the Internet.

Ad exchange computing devices 120a, 120b, 120c can be any computing device, such as a server or multiple servers, each of which can be operated by a different entity. In some embodiments, ad exchange computing devices 120a, 120b, 120c can perform auctions for advertising display opportunities in online media, such as webpages or application content served by publisher system 125, that are provided to user devices 102 and/or 107. Bid determination computing devices 115a, 115b can submit bids for such advertising opportunities on behalf of advertisers, and if a bid determination computing device wins the auction, it can provide source code or other display data for a computerized graphical advertisement display to fill the advertising display opportunity. Publisher system 125 can be any computing device, such as a server or multiple servers. In some embodiments, publisher system 125 can serve webpages to browser 105. In some embodiments, publisher system 125 can serve other content to application 110. In some embodiments, publisher system 125 can communicate with bid determination computing devices 115a, 115b to determine whether bid determination computing devices 115a, 115b will provide source code for a computerized graphical advertisement display to fill an advertisement display opportunity in a webpage or application content.

Figure 2:
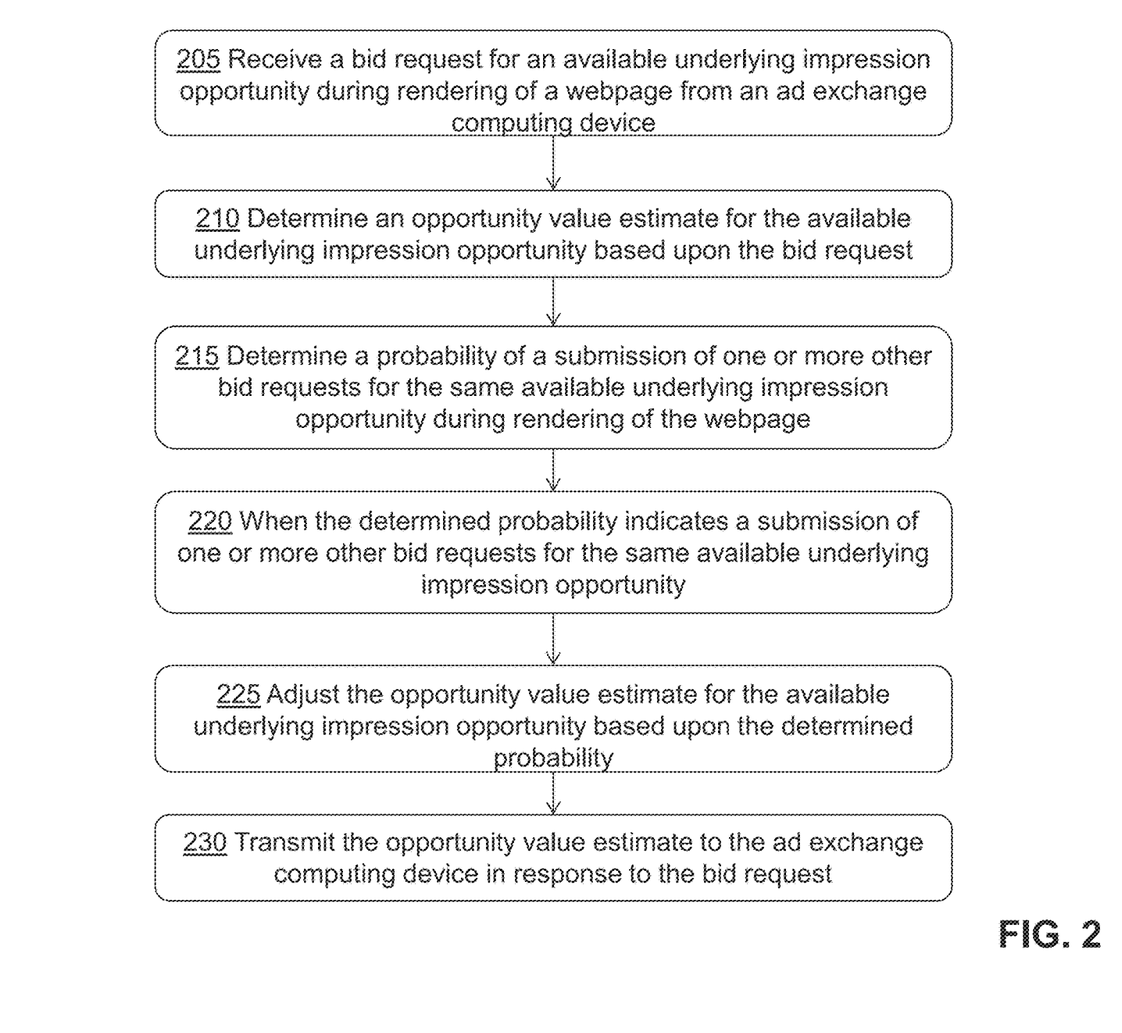
FIG. 2 depicts a flow chart for predictive adjusted bidding for electronic advertisements.

FIG. 2 is a flow diagram of a method of predictive adjusted bidding for electronic advertisements, using the system 100 of FIG. 1. A publisher system (e.g., publisher system 125) receives a request for graphical display source code for a computerized graphical advertisement display to be inserted into one or more available underlying impression opportunities on a webpage (e.g., during rendering of a webpage and/or during playback of a video). For example, the impression opportunities can correspond to ad space on a particular webpage, such as a banner display ad. The request can be received from a browser or other application executing on a user device (e.g., browser 105 on user device 102) on which the webpage is displayed. The publisher system 125 transmits the request to one or more of the ad exchange computing devices 120a, 120b, 120c. In some embodiments, the publisher system 125 transmits a request relating the same underlying impression opportunity to multiple ad exchange computing devices, or in some cases, the publisher system 125 transmits multiple requests relating to the same underlying impression opportunity to a single ad exchange computing device (for example, each of the multiple requests may involve a different floor price). The ad exchange computing devices 120a, 120b, 120c that received the request from the publisher device 125 transmit a bid request to the bid determination computing devices 115a, 115b at the DSP for requisition of a corresponding bid for the available underlying impression opportunity, and at step 205, the bid determination computing devices 115a, 115b receive the bid request(s).

At step 210, each bid determination computing device 115a, 115b that received a bid request determines an opportunity value estimate for the available underlying impression opportunity that is identified in the bid request. Generally, the bid determination computing device provides an opportunity value estimate on behalf of an advertiser that wishes to insert a graphical advertisement into the impression opportunity on the webpage. The bid determination computing device uses one or more data elements contained in the bid request message (e.g., such as characteristics associated with the available underlying impression opportunity and/or bid request) to generate an opportunity value estimate (also called a bid) that is responsive to the request for submission to the ad exchange computing device that provided the bid request. Exemplary characteristics include, but are not limited to, characteristics associated with a publisher of the impression opportunity, a URI associated with the impression opportunity, a time of day associated with the bid request, a user identifier associated with the impression opportunity, and a format of impression associated the impression opportunity. In some embodiments, the bid determination computing device 115a determines an expected profitability of the available underlying impression opportunity associated with the received bid request, when a bid placed in response to the bid request would win the available underlying impression opportunity, using one or more of: a characteristic of the bid request or a predicted profitability based upon information from prior similar bid requests. As an example, the bid determination computing device 115a can scale the new opportunity value by a factor (1-a) where a is proportional to the historical probability to win the impression opportunity on another channel. This historical probability is computed as an empirical average on past similar requests.

In some embodiments, bid requests from the multiple ad exchange computing devices 120a, 120b, 120c are received by different bid determination computing devices 115a, 115b at the DSP at or substantially at the same time. Because the bid requests typically require a real-time response, it is impractical or impossible for each bid determination computing device to answer its own bid requests while being aware of the receipt of the other bid requests by the other bid determination computing devices that relate to the same underlying impression opportunity. Therefore, it is important for each bid determination computing device to predict or estimate the probability that one or more other bid requests for the same available underlying impression opportunity are submitted (or will be submitted) to other computing devices at the DSP during rendering of the webpage. This probability can be used to adjust the bid generated by the bid determination computing device in order to make it more cost-effective for the advertiser.

At step 215, each bid determination computing device that received a bid request determines a probability of a submission of one or more other bid requests for the same available underlying impression opportunity based upon the bid request. For example, the bid determination computing device 115a can utilize a supply channel mapping to predict which other ad exchange computing device(s) submitted a bid request at the same time for the same underlying impression opportunity and determine (i) whether to submit a bid in response to the bid request and/or (ii) what price the submitted bid should be. The supply channel mapping can be generated by the DSP based upon historical information regarding the available impression opportunities, the publishers, the ad exchanges, and so forth.

For example, the bid determination computing devices 115a, 115b at the DSP can collect information over time regarding the bid requests that are received from various ad exchange computing devices 120a, 120b, 120c and generate an ad inventory database where each available impression opportunity is labeled with certain characteristics (e.g., publisher, webpage, pricing, auction type, timestamp, other bid characteristics) and in some embodiments, auctions that occur simultaneously on the same available impression opportunity are grouped together. The bid determination computing devices 115a, 115b can then compute certain statistics (pricing, reliability) about the different grouped auctions on the same impression opportunity. The statistics for a given auction/impression opportunity are then used by the devices 115a, 115b during subsequent auctions both to determine a probability that multiple ad exchanges have submitted (or will submit) bid requests for the same available impression opportunity and to determine whether to submit a bid in response to particular bid requests (e.g., depending on the pricing of the bid request received by the device 115a versus the probability that other bid requests with more favorable pricing terms have been or will be received by other devices, etc.).

Another approach is for the bid determination computing device 115a to cast the determination of other bid requests submitted for the same opportunity as a classification problem. In this example, the system creates a dataset using historical data. The dataset contains one sample per bid requests along with attached explanatory variables and a label. Each request may be grouped as determined by the presence of common attributes: time of arrival, user identifier, format etc. Examples of explanatory variables are publisher identifier, format, ad exchange, URL. The label is deduced from the grouping: if there are other requests, the label is positive, or if there are no other requests, the label is negative. The system then trains a prediction model on this dataset with the goal of predicting if other ad exchanges have submitted other requests using the aforementioned explanatory variables. An example of such a model is a logistic regression for predicting a binary target: there are or are not other requests. Another model can be trained to predict which other ad exchanges have submitted a bid. In that case, a multi-label classification model is trained, such as multinomial logistic regression. An example of such classification modeling is found in Krishnapuram, B., Carin, L., Figueiredo, M. A., & Hartemink, A. J., "Sparse multinomial logistic regression: Fast algorithms and generalization bounds," IEEE transactions on pattern analysis and machine intelligence, 27(6), 957-968 (2005), which is incorporated herein by reference.

As mentioned above, in some embodiments, the DSP identifies that a plurality of bid requests are for the same available underlying impression opportunity. In one example, the DSP determines a time of arrival for each of the bid requests received from the ad exchange computing devices 120a, 120b, 120c. The time of arrival can be determined using a timestamp encoded in the bid request message. The DSP can compare the respective times of arrival for each of the bid requests to determine whether the times of arrival are similar (e.g., within a predetermined window, such as 10 ms). Bid requests received outside of the predetermined window, even when for the same impression opportunity, may be considered as being for a different auction than bid requests received inside the predetermined window. In another example, the DSP determines a similarity between a publisher associated with each of the received bid requests. As described previously, a publisher may provide multiple requests for the same impression opportunity with different pricing floors and identification of a similarity between a publisher associated with the bid requests can be used by the DSP to identify that a plurality of bid requests are for the same impression opportunity.

Table 1 below contains exemplary data associated with multiple bid requests:

TABLE 1

| bid_request_id | user_id | request timestamp | publisher | RTB platform | format |
|---|---|---|---|---|---|
| 1 | abcd1234 | 1498227000 | www.example.com | RTB_1 | 300 × 250 |
| 2 | abcd1234 | 1498227000 | www.example.com | RTB_2 | 300 × 250 |
| 3 | abcd1234 | 1498227000 | www.example.com | RTB_3 | 300 × 250 |
| 4 | abcd1234 | 1498227060 | www.example.com | RTB_1 | 300 × 600 |
| 5 | abcd1234 | 1498227060 | www.example.com | RTB_4 | 300 × 600 |
| 6 | efgh5678 | 1498227060 | www.example.com | RTB_5 | 300 × 250 |
| 7 | efgh5678 | 1498227120 | www.publisher.net | RTB_2 | 300 × 250 |
| 8 | efgh5678 | 1498227120 | www.publisher.net | RTB_3 | 300 × 600 |

In another example, the DSP determines a similarity between a format of the impression associated with each of the plurality of bid requests to identify whether the requests are for the same impression opportunity. For example, each of the bid requests can include a data element that indicates the format of the impression (e.g., size, placement, etc.). When the DSP determines that the impression format is the same between two bid requests, the DSP can determine that the bid requests are for the same impression opportunity. In yet another example, the DSP determines a similarity between an ad exchange that transmitted each of the plurality of bid requests, to identify whether the requests are for the same impression opportunity. For example, each of the bid requests can include a data element that indicates the name or identifier of the ad exchange from which the bid request was received. When the DSP determines that the ad exchange is the same between two bid requests, the DSP can determine that the bid requests are for the same impression opportunity.

In some embodiments, the bid determination computing device uses a denoising process to identify whether the plurality of bid requests are for the same impression opportunity. The denoising process uses historical bid requests (e.g., stored in a database) and compares the current bid requests with the historical bid requests to identify whether they are for the same impression opportunity. As an example, the bid determination computing device 115a applies one or more filters on the historical bid requests stored, to be able to cope with the amount of data analyzed. Bid requests are filtered based on the quality (e.g., lack of information, temporal instability) of the data received.

Figure 8:
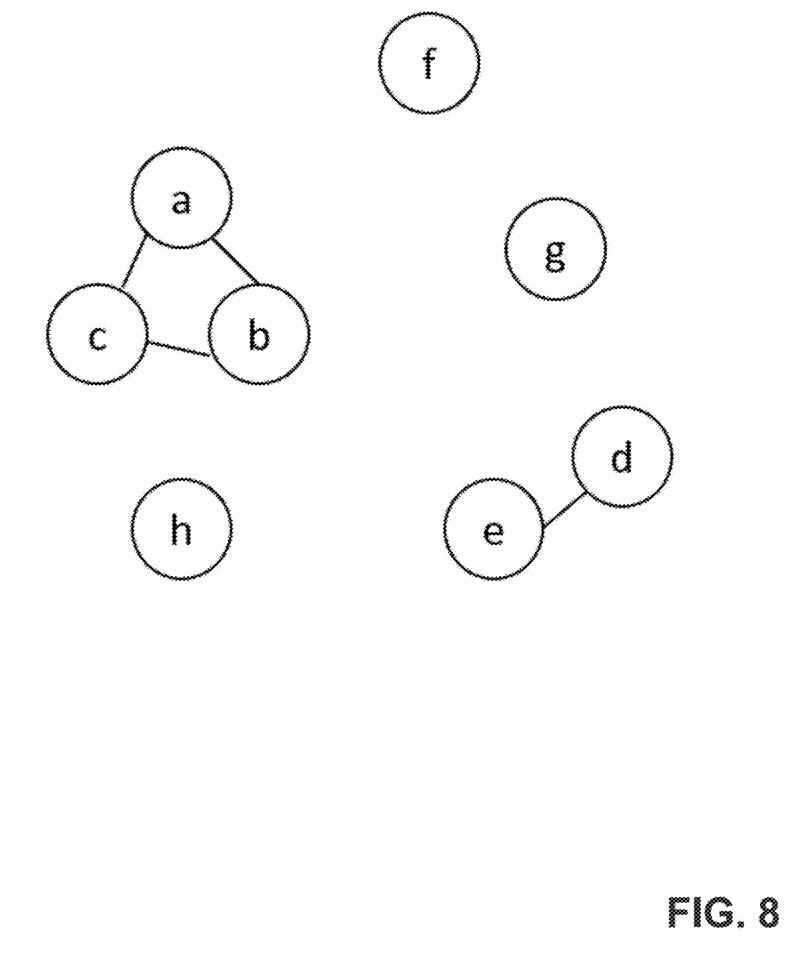
FIG. 8 is an exemplary graph generated by the bid determination computing device.

In one example, the bid determination computing device can generate a graph representation of the ad space to determine the probability of multiple bid requests for the same impression opportunity. In the graph representation, each node of the graph is a channel to access ad inventory. Nodes linked together in the graph represent different channels that access the same underlying inventory. The following is an example of how the bid determination computing device can create such a graph representation.

The bid requests shown in Table 1 above arrive at the bid determination computing device. The bid determination computing device defines a node by attributes of an ad that the system may place a bid for, e.g., a triplet of attributes (publisher, RTB platform, format). The bid determination computing device defines a co-event as a group of bid requests that have similar attributes (e.g., publisher, format) that all arrive at the bid determination computing device for a specific user at the same timestamp. A co-event (also called a 'group') of bid requests takes the ID of the smallest bid_request_id (in term of alpha-numerical ranking) inside the co-event. A link between nodes is created every time two nodes fall in the same co-event. Links between nodes can be weighted according to the number of co-events shared by those nodes. A graph is determined by a set of nodes and their associated links.

In this example, the nodes are shown in Table 2 below:

TABLE 2

| node_id | publisher | RTB platform | format |
|---------|-----------|--------------|--------|
| a | www.example.com | RTB_1 | 300 × 250 |
| b | www.example.com | RTB_2 | 300 × 250 |
| c | www.example.com | RTB_3 | 300 × 250 |
| d | www.example.com | RTB_1 | 300 × 600 |
| e | www.example.com | RTB_4 | 300 × 600 |
| f | www.example.com | RTB_5 | 300 × 250 |
| g | www.publisher.net | RTB_2 | 300 × 250 |
| h | www.publisher.net | RTB_3 | 300 × 600 |

Figure 3:
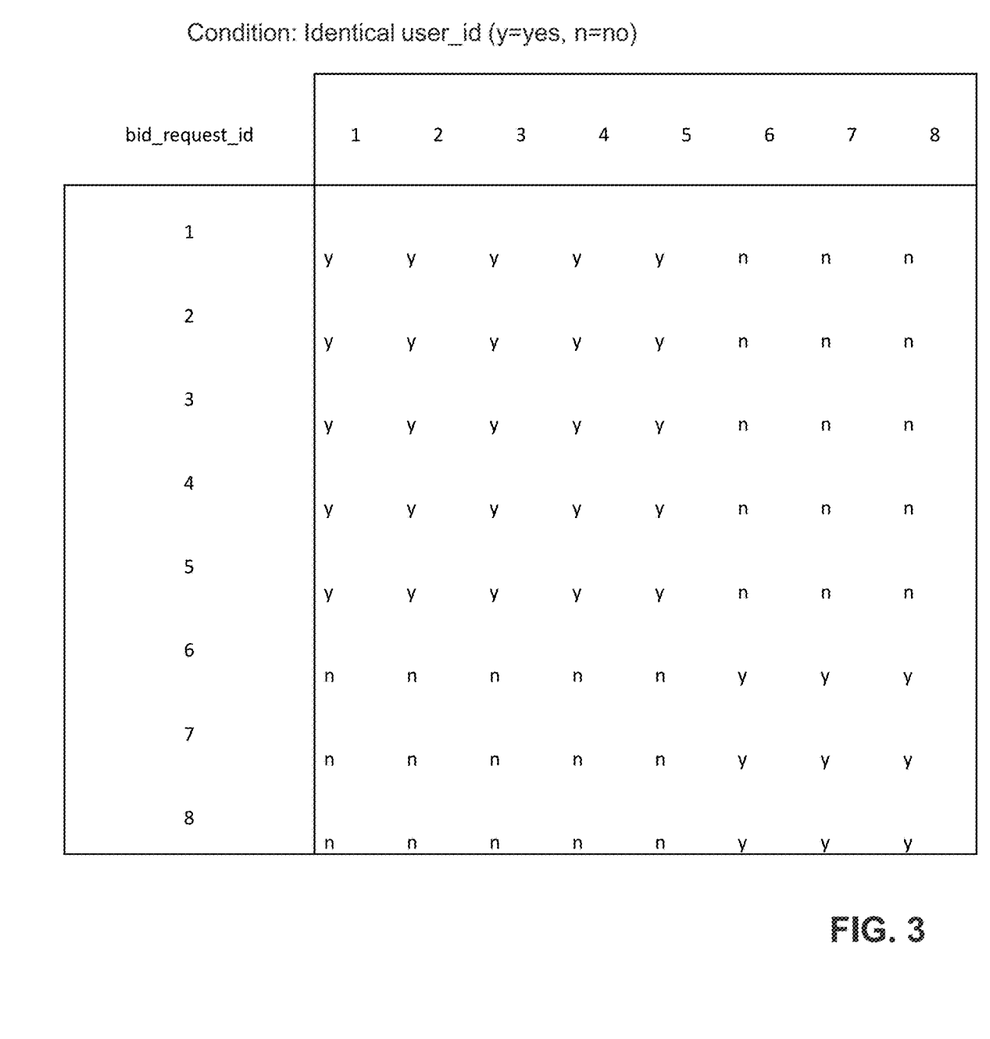
FIG. 3 is a matrix generated by the bid determination computing device based upon the condition of identical user ids.
Figure 4:
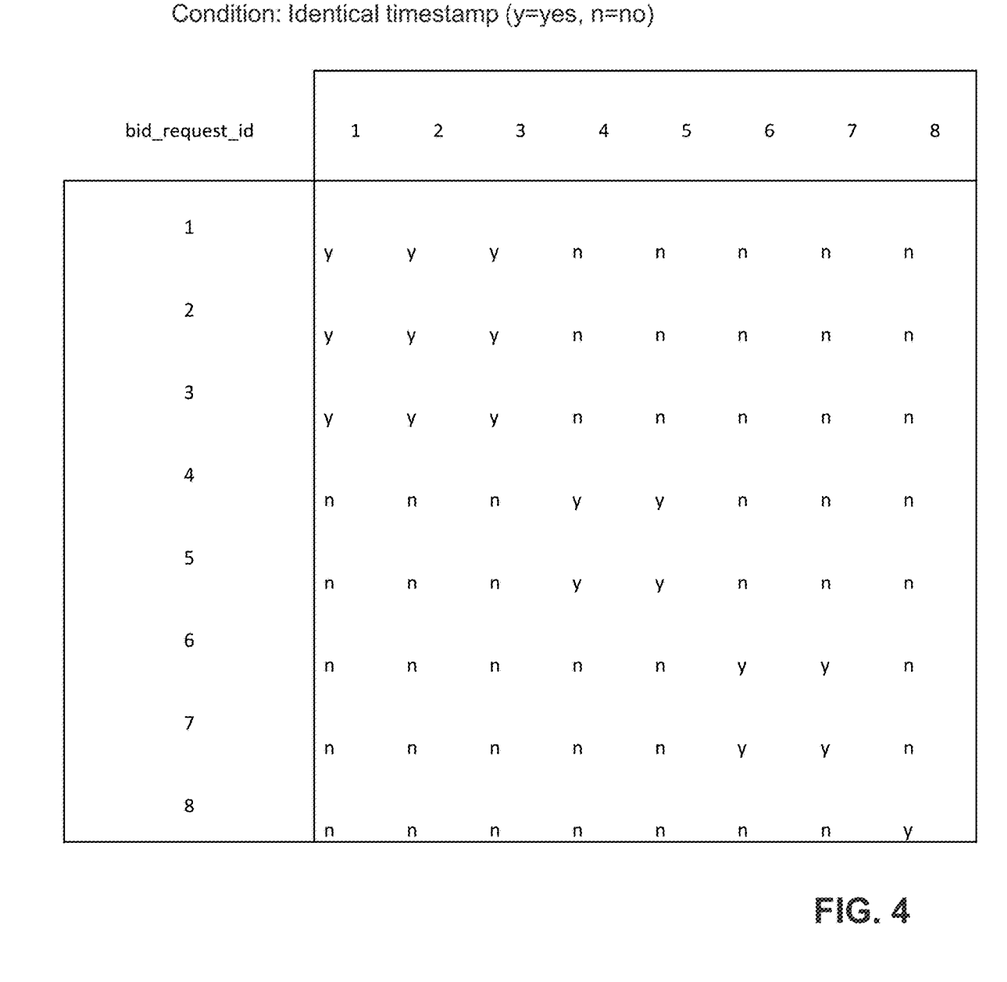
FIG. 4 is a matrix generated by the bid determination computing device based upon the condition of identical timestamps.
Figure 5:
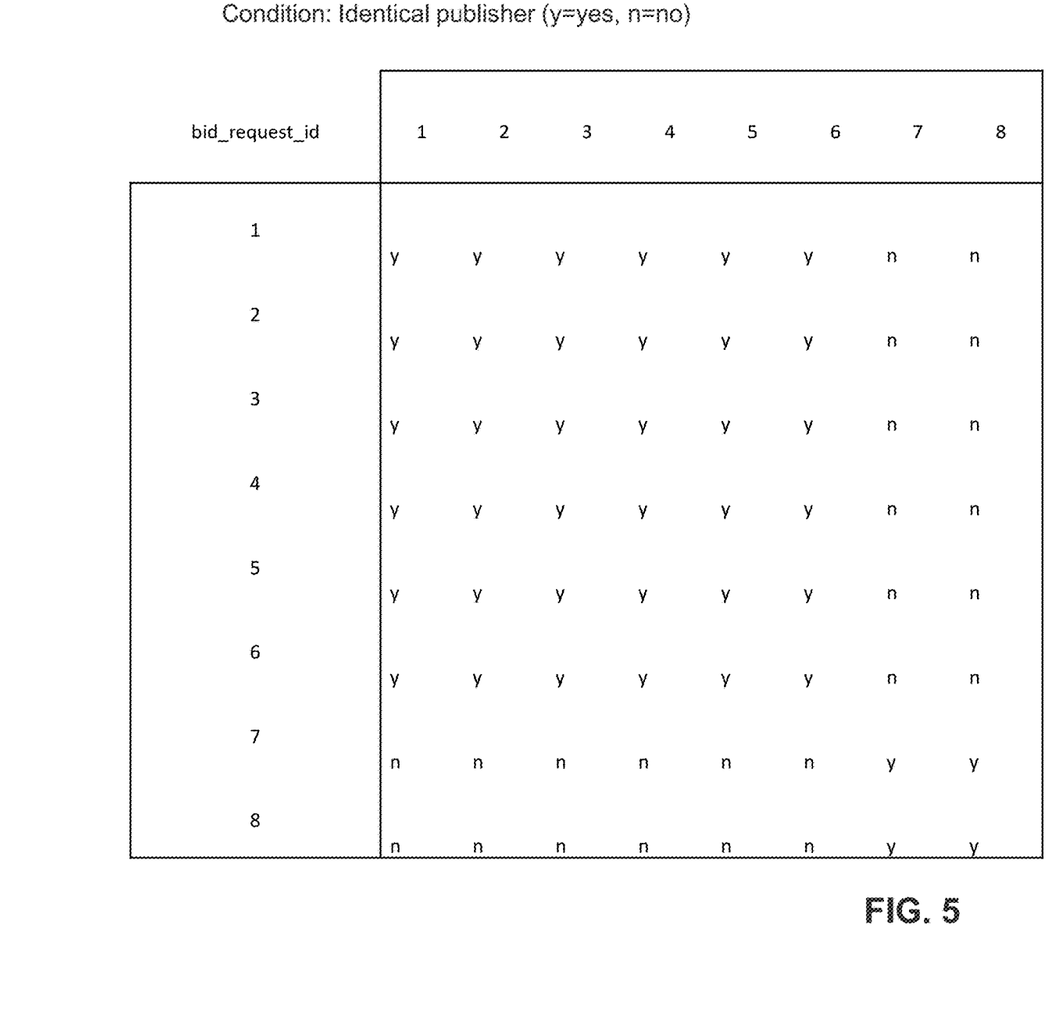
FIG. 5 is a matrix generated by the bid determination computing device based upon the condition of identical publishers.
Figure 6:
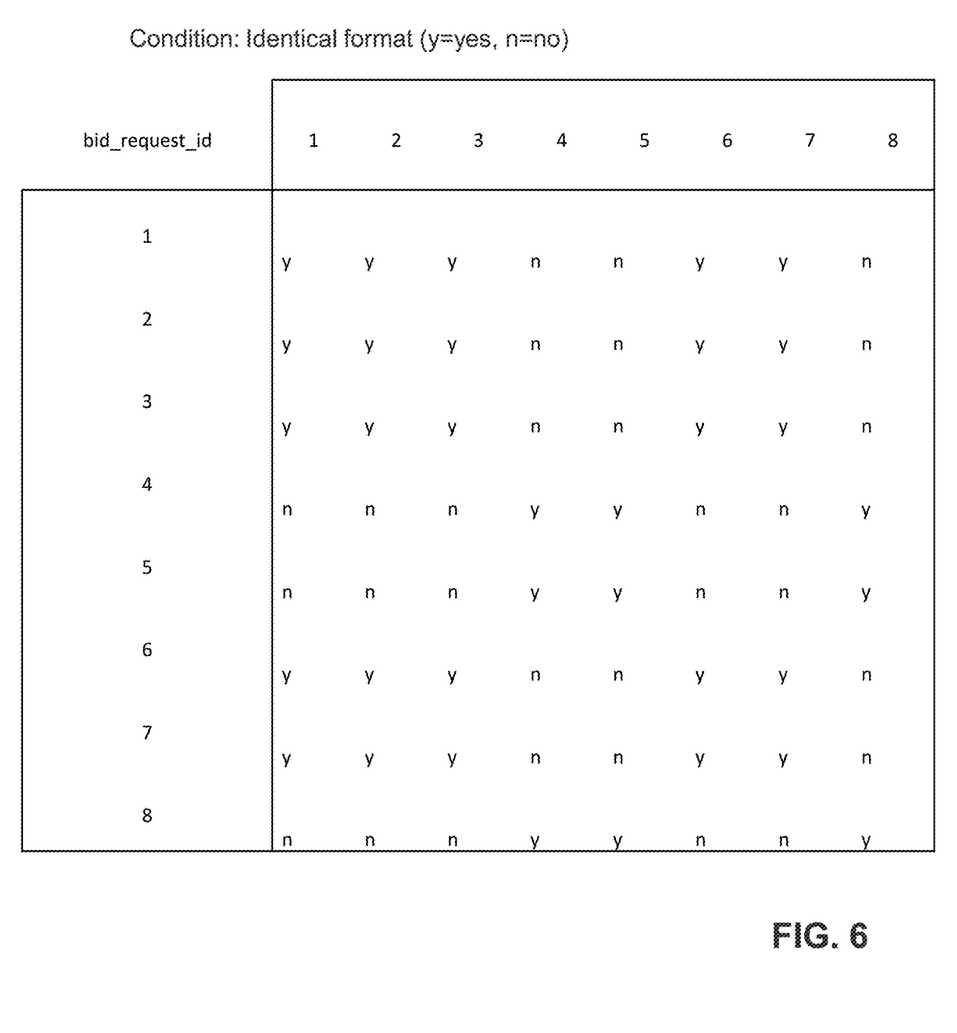
FIG. 6 is a matrix generated by the bid determination computing device based upon the condition of identical format.

The bid determination computing device determines matrices for the fulfilling of different conditions for each couple of requests. FIGS. 3-6 depict matrices generated by the bid determination computing device based upon a different condition. FIG. 3 is a matrix generated by the bid determination computing device based upon the condition of identical user ids (where y=yes, n=no). FIG. 4 is a matrix generated by the bid determination computing device based upon the condition of identical timestamps (where y=yes, n=no). FIG. 5 is a matrix generated by the bid determination computing device based upon the condition of identical publishers (where y=yes, n=no). FIG. 6 is a matrix generated by the bid determination computing device based upon the condition of identical format (where y=yes, n=no).

Figure 7:
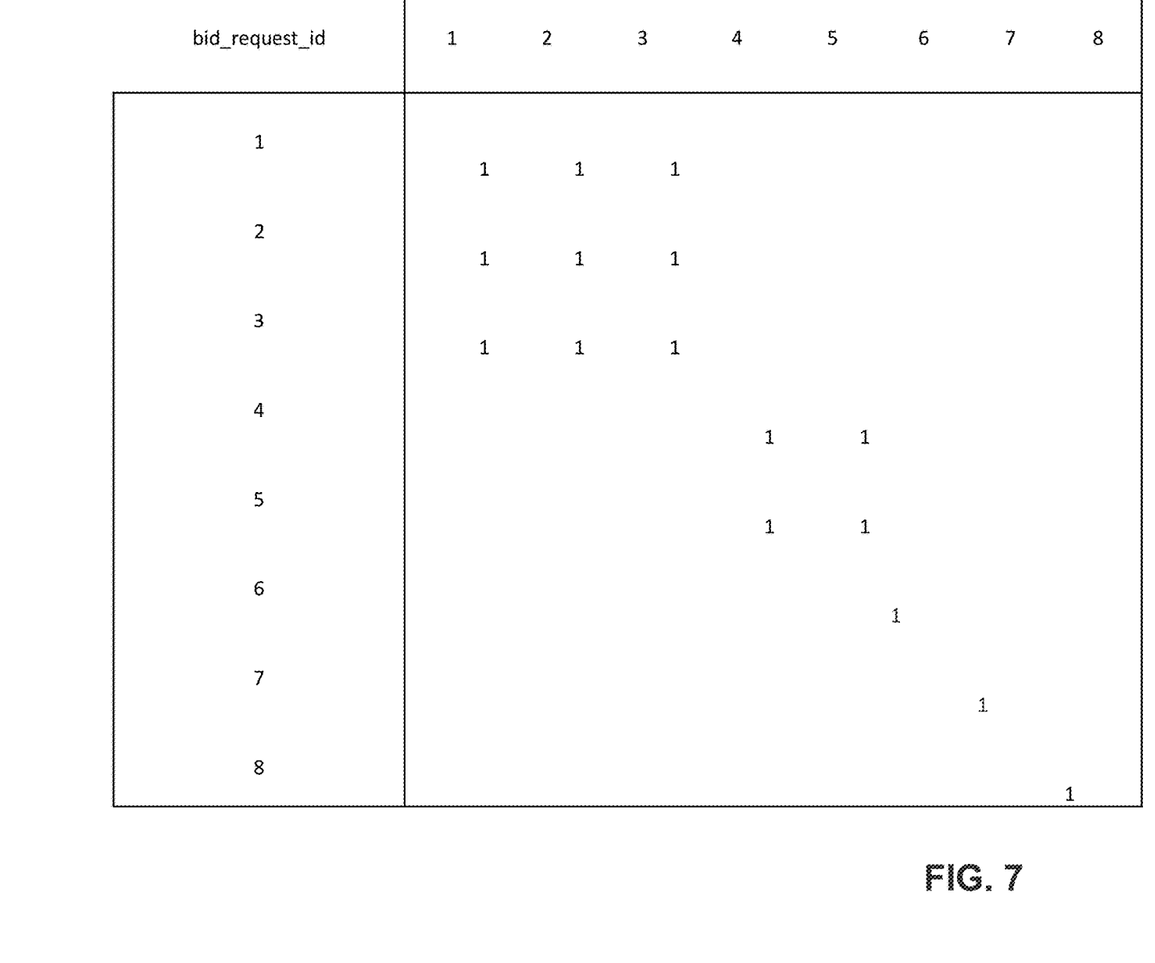
FIG. 7 is a matrix generated by the bid determination computing device showing groups of bid requests that have similar attributes.

Each couple of requests for which the conditions are fulfilled constitutes a co-event. FIG. 7 is a matrix showing groups of bid requests that have similar attributes. For example, one co-event is defined as the group of bid requests 1, 2, and 3 (shown as a square of ones in the upper-left corner of the matrix). Similarly, another co-event is defined as the group of bid requests 4 and 5.

For each node, the bid determination computing device counts the number of links with a different node on all bid requests, and generates a graph of the nodes. FIG. 8 is an exemplary graph generated by the bid determination computing device, with the nodes associated with bid requests that have similar attributes connected to each other.

Using the graph, when the bid determination computing device receives a request for, e.g., channel "a," the device may determine that another computing device has probably received (or will probably receive) requests for channel "b" and "c"—all of which actually corresponding to the same underlying opportunity. Conversely, when the bid determination computing device receives a bid request corresponding to channel "f," the device may determine that no other computing devices have received (or will receive) other bid requests for the same inventory.

At step 220, the bid determination computing device 115a evaluates the determined probability to understand whether it is more probable or less probable that one or more other bid requests for the same available underlying impression opportunity have been or will be submitted. When the determined probability indicates a submission of one or more other bid requests for the same underlying impression opportunity, at step 225 the bid determination computing device 115a adjusts the opportunity value estimate for the available underlying impression opportunity based upon the probability.

In some embodiments, the bid determination computing device adjusts the opportunity value estimate for the available underlying impression opportunity based upon one or more of: the expected profitability, the predicted profitability, or one or more characteristics of the bid request. For example, as mentioned above, the bid determination computing device generates an expected profitability for the impression opportunity. The bid determination computing device can generate an amount that is dependent upon the determined probability that one or more other bid requests are received or will be received for the same impression opportunity and then adjust the bid based upon that amount. In another example, the bid determination computing device can adjust the opportunity value estimate by an amount that is dependent upon an estimated profitability associated with one or more of the other bid requests. For example, if the estimated profitability for one of the other bid requests is higher than the estimated profitability for the present bid request, the bid determination computing device can adjust the bid that is responsive to the present bid request so that it is less likely to win the auction—with the expectation that the bid submitted in response to the more profitable bid request will win. In some embodiments, the bid determination computing device adjusts the opportunity value estimate to zero—indicating that the computing device prefers not to win the auction. In another embodiment, the bid determination computing device decides whether to submit a bid in response to the bid request based upon the estimated profitability associated with the one or more other bid requests and one or more predicted characteristics of the other bid requests.

For instance, one bidding strategy consists in bidding if and only if the expected profit when the bid is submitted is greater than the expected profit if the bid is not submitted. Another bidding strategy consists in bidding proportionally to the inverse of the expected number of bid requests for the same opportunity.

At step 230, the bid determination computing device 115a transmits the opportunity value estimate to the ad exchange computing device (e.g., device 120a) in response to the bid request. The opportunity value estimate that is transmitted to the ad exchange computing device may be adjusted as described above or, in some instances, the opportunity value estimate is not adjusted (i.e., the determined probability indicates that no other bid requests have been received or will be received for the impression opportunity).

If the opportunity value estimate submitted by the bid determination computing device 115a is selected by the ad exchange computing device 120a as the winning bid, the ad exchange computing device generates graphical display source code to be inserted into the available impression opportunity. The ad exchange computing device transmits the graphical display source code to the publisher system 125 for display on the user device.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application specific-integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A computerized method of predictive adjusted bidding for electronic advertisements, the method comprising:
   generating, by a demand side platform comprising a plurality of bid determination computing devices, an advertising inventory database by:
   a) identifying a plurality of bid requests received by two or more different bid determination computing devices,
   b) determining a time of arrival, a requested impression format, a publisher ID, and a bid price for each of the identified bid requests using data encoded in the identified bid request,
   c) comparing the times of arrival for each of the identified bid requests to identify two or more of the bid requests that were received by different bid determination computing devices within the same time window of 10 ms or less, d) selecting at least two of the bid requests from the identified two or more bid requests that have a same requested impression format and a same publisher ID, e) determining that the selected at least two bid requests are for a same underlying impression opportunity based upon the times of arrival, the publisher IDs, and requested impression formats for the selected at least two bid requests, f) aggregating the selected at least two bid requests into a group associated with the same underlying impression opportunity, g) discarding the remaining bid requests in the plurality of bid requests that were not selected, and h) repeating steps a)-g) until each bid request of the plurality of bid requests has been placed into a group of bid requests;

receiving, by a first bid determination computing device of the demand side platform from an advertising exchange computing device, a first bid request for an available impression opportunity during rendering of a webpage, the first bid request comprising a first impression format and a first publisher ID;

determining, by the first bid determination computing device, a bid for the available impression opportunity based upon the bid price in one of the groups of bid requests in the advertising inventory database that has a same impression format as the first impression format and a same publisher ID as the first publisher ID;

determining, by the first bid determination computing device, a probability of receipt of one or more other bid requests for the same available impression opportunity during rendering of the webpage by one or more other bid determination computing devices of the demand side platform, based upon the number of bid requests in the group of bid requests in the advertising inventory database that has the same impression format as the first impression format and the same publisher ID as the first publisher ID;

when the determined probability indicates a likelihood that one or more other bid requests have been submitted for the same available impression opportunity:

adjusting, by the first bid determination computing device, the bid for the available impression opportunity based upon an amount that is dependent upon the determined probability; and transmitting, by the first bid determination computing device, the adjusted bid to the advertising exchange computing device in response to the first bid request.

2. The method of claim 1, wherein identifying that the first bid request and one or more other bid requests received from one or more other ad exchange computing devices are for the same underlying impression opportunity is based upon at least one characteristic of the underlying impression opportunity.

3. The method of claim 2, wherein the at least one characteristic of the underlying impression opportunity is a characteristic received from the advertising exchange computing device that submitted a corresponding bid request.

4. The method of claim 2, wherein the at least one characteristic is associated with a publisher of the underlying impression opportunity.

5. The method of claim 2, wherein the at least one characteristic of the underlying impression opportunity is a uniform resource identifier (URI) associated with the underlying impression opportunity.

6. The method of claim 2, wherein the at least one characteristic of the underlying impression opportunity is a user identifier associated with the underlying impression opportunity.

7. The method of claim 1, further comprising:

determining, by the first bid determination computing device, an expected profitability of the available impression opportunity, when a bid placed in response to any bid request would win the available impression opportunity, using one or more of: a characteristic of the first bid request or a predicted profitability based upon information from one or more groups of bid requests in the advertising inventory database that are associated with the available impression opportunity.

8. The method of claim 1, wherein the demand side platform identifies that the plurality of bid requests are for the same underlying impression opportunity based upon a similarity between a publisher associated with each of the plurality of bid requests.

9. The method of claim 1, wherein the demand side platform identifies that the plurality of bid requests are for the same underlying impression opportunity based upon a similarity between an advertising exchange that submitted each of the plurality of bid requests.

10. The method of claim 1, wherein adjusting the bid for the available impression opportunity comprises decreasing the bid to zero.

11. The method of claim 10, further comprising deciding, by the first bid determination computing device, whether to submit a bid in response to the first bid request based upon an estimated profitability associated with one or more of the other bid requests based upon information from one or more groups of bid requests in the advertising inventory database that are associated with the available impression opportunity and one or more predicted characteristics of the other bid requests based upon information from one or more groups of bid requests in the advertising inventory database that are associated with the available impression opportunity.

12. The method of claim 1, wherein the advertising exchange computing device is a real-time bidding platform, an ad server, a computing device executing an auction for the available impression opportunity within a browser, or a computing device executing an auction for the available impression opportunity within a mobile application.

13. The method of claim 1, wherein the first bid request for the available impression opportunity is received during playback of a video.

14. The method of claim 1, wherein the first bid request is received from a remote computing system via an interface to the first bid determination computing device.

15. The method of claim 14, wherein the interface is a web service application programming interface (API).

16. A computerized system of predictive adjusted bidding for electronic advertisements, the system comprising a demand side platform including a plurality of bid determination computing devices, and a plurality of advertising exchange computing devices, the system configured to:

generate an advertising inventory database by:

a) identifying a plurality of bid requests received by two or more different bid determination computing devices, b) determining a time of arrival, a requested impression format, a publisher ID, and a bid price for each of the identified bid requests received by one or more of the bid determination computing devices using data encoded in the plurality of bid requests, determining a time of arrival, a requested impression format, a publisher ID, and a bid price for a plurality of each of the identified bid requests using data encoded in the identified bid request, c) comparing the times of arrival for each of the plurality of identified bid requests to identify two or more of the bid requests that were received by different bid determination computing devices within the same time window of 10 ms or less, d) selecting at least two of the bid requests from the identified two or more bid requests that have a same requested impression format and a same publisher ID, e) determining that the selected at least two bid requests are for a same underlying impression opportunity based upon the times of arrival, the publisher IDs, and the requested impression formats for the selected at least two bid requests, f) aggregating the selected at least two bid requests into a group associated with the underlying impression opportunity, g) discarding the remaining bid requests in the plurality of bid requests that were not selected, and h) repeating steps a)-g) until each bid request of the plurality of bid requests has been placed into a group of bid requests;

receive, by a first bid determination computing device from one of the advertising exchange computing devices, a first bid request for an available impression opportunity during rendering of a webpage, the first bid request comprising a first impression format and a first publisher ID;

determine, by the first bid determination computing device, a bid for the available impression opportunity based upon the bid price in one of the groups of bid requests in the advertising inventory database that has a same impression format as the first impression format and a same publisher ID as the first publisher ID;

determine, by the first bid determination computing device, a probability of receipt of one or more other bid requests for the same available impression opportunity during rendering of the webpage by one or more other bid determination computing devices, based upon the number of bid requests in the group of bid requests in the advertising inventory database that has the same impression format as the first impression format and the same publisher ID as the first publisher ID;

when the determined probability indicates a likelihood that one or more other bid requests have been submitted for the same available impression opportunity:

adjust, by the first bid determination computing device, the bid for the available impression opportunity based upon an amount that is dependent upon the determined probability; and transmit, by the first bid determination computing device, the adjusted bid to the advertising exchange computing device in response to the first bid request.

17. The method of claim 1, wherein the predetermined time window is 10 ms.

18. The system of claim 16, wherein the predetermined time window is 10 ms.

* * * * *